United States Patent
Mai et al.

(10) Patent No.: US 10,320,329 B2
(45) Date of Patent: Jun. 11, 2019

(54) METHOD AND SYSTEM FOR DETERMINING CURRENT-VOLTAGE CHARACTERISTICS OF A PHOTOVOLTAIC INSTALLATION

(71) Applicant: COMMISSARIAT A L'ENERGIE ATOMIQUE ET AUX ENERGIES ALTERNATIVES, Paris (FR)

(72) Inventors: Thi Than Yen Mai, Ha Noi (VN); Nicolas Chaintreuil, Montmelian (FR); Jean-Baptiste Desmouliere, Saint-Jean-d' Arvey (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/352,909

(22) Filed: Nov. 16, 2016

(65) Prior Publication Data
US 2017/0149382 A1    May 25, 2017

(30) Foreign Application Priority Data

Nov. 20, 2015   (FR) ...................................... 15 61171

(51) Int. Cl.
H02S 50/10    (2014.01)
H02S 50/00    (2014.01)

(52) U.S. Cl.
CPC .............. *H02S 50/10* (2014.12); *H02S 50/00* (2013.01)

(58) Field of Classification Search
None
See application file for complete search history.

(56) References Cited

U.S. PATENT DOCUMENTS 4,129,823 A      12/1978  van der Pool et al.
5,671,181 A  *   9/1997   Hatsuda ................. G11C 7/062
                                                          365/189.05

(Continued)

FOREIGN PATENT DOCUMENTS

JP         2003-28916 A      1/2003

OTHER PUBLICATIONS

French Search Report and Written Opinion dated May 10, 2016 issued in corresponding application No. FR1561171; w/ English partial translation and partial machine translation (10 pages).

*Primary Examiner* — Tung S Lau
(74) *Attorney, Agent, or Firm* — Westerman, Hattori, Daniels & Adrian, LLP

(57) ABSTRACT

The method includes connecting a MOSFET-type transistor to the photovoltaic installation; applying, to the transistor, a signal of a control voltage (Vgs) that crosses a linear regime range ($\varphi_{lin}$) of the transistor, between two critical voltages including a saturation voltage (Vgs(sat)) and a threshold voltage (Vgs(th)), and measuring the current and the voltage of the photovoltaic installation while the linear regime range of the transistor is being crossed. The control voltage signal (Vgs) of the transistor is generated from a digital control signal. The transistor initially being in short-circuit ($\varphi_{cc}$) or open-circuit ($\varphi_{co}$) regime, a command is issued for a first, rapid variation (BT1) in the control voltage (Vgs) in the direction of the linear regime range of the transistor, then a second, slow variation (BT2) in the control voltage (Vgs) crossing the linear regime range of the transistor, the transition between the first and the second variation being discontinuous.

20 Claims, 5 Drawing Sheets

(56) References Cited

U.S. PATENT DOCUMENTS

| | | | | |
|---|---|---|---|---|
| 5,793,247 | A * | 8/1998 | McClure | G05F 3/262 |
| | | | | 327/530 |
| 8,159,238 | B1 | 4/2012 | Krasowski et al. | |
| 8,787,539 | B2 * | 7/2014 | Marchetti | H04B 3/02 |
| | | | | 370/352 |
| 2003/0022430 | A1 * | 1/2003 | Emrick | H01L 21/8258 |
| | | | | 438/234 |
| 2003/0151453 | A1 * | 8/2003 | Laletin | H03K 5/1565 |
| | | | | 327/551 |
| 2003/0179034 | A1 * | 9/2003 | Melis | B60L 11/1805 |
| | | | | 327/427 |
| 2007/0072569 | A1 * | 3/2007 | McCarthy | H03G 1/007 |
| | | | | 455/249.1 |
| 2014/0361960 | A1 * | 12/2014 | Yamauchi | G09G 3/3233 |
| | | | | 345/76 |
| 2018/0012635 | A1 * | 1/2018 | Quelen | G11C 5/147 |

* cited by examiner

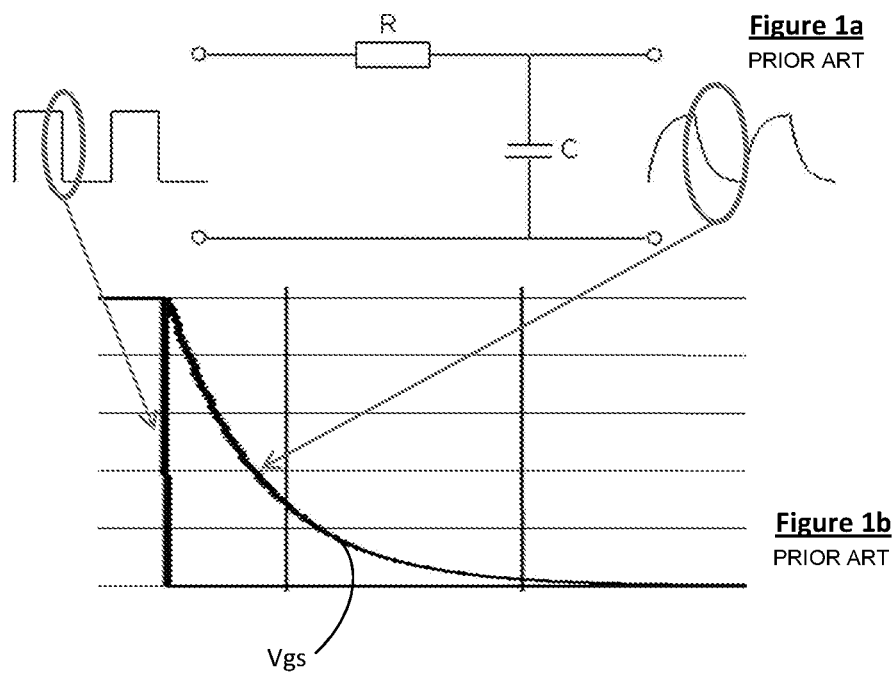

METHOD AND SYSTEM FOR DETERMINING CURRENT-VOLTAGE CHARACTERISTICS OF A PHOTOVOLTAIC INSTALLATION

This application claims priority of French application No. 1561171 filed Nov. 20, 2015, which is hereby incorporated by reference herein in its entirety.

TECHNICAL FIELD OF THE INVENTION

The invention relates to a method and a system for determining current-voltage characteristics of a photovoltaic installation, in particular allowing the characteristic current-voltage curve of the photovoltaic installation to be plotted.

PRIOR ART

In order to ensure that a photovoltaic installation, comprising one or more photovoltaic panels or modules, is operating correctly, testing tools allowing the I-V, or current-voltage, curve of the installation to be plotted are commercially available. In order to plot this characteristic curve, it is necessary to disconnect the photovoltaic installation and therefore to momentarily interrupt the operation thereof. This results in loss of electrical energy production. In order to monitor all of the photovoltaic modules, or strings of photovoltaic modules, of a photovoltaic plant, it is often necessary for the operation of the plant to be suspended for the entire day, which is highly disadvantageous for the operator.

A known technique for plotting the I-V curve of a photovoltaic installation uses a MOSFET transistor that is connected to the terminals of the installation. A control voltage signal Vgs applied between the gate and the source of the MOSFET controls the transistor in order to make it switch from a short-circuit or saturation phase in which the MOSFET behaves as a closed switch, the voltage Vgs being higher than a saturation voltage Vgs(sat), to an open-circuit phase in which the MOSFET behaves as an open switch, the voltage Vgs being lower than a threshold voltage Vgs(th), while passing through a linear phase in which the MOSFET behaves as a resistor, the voltage Vgs then being between Vgs(sat) and Vgs(th). In this linear phase, the voltage V across the terminals of the photovoltaic installation passes from a zero voltage to an open-circuit voltage $V_{oc}$, while the current I produced by the photovoltaic installation passes from the short-circuit current $I_{cc}$ to a zero current. The I-V curve may therefore be plotted on the basis of current and voltage measurements in the transitional linear phase between the saturation or short-circuit phase of the MOSFET and the open-circuit phase of the MOSFET.

Referring to FIGS. 1a and 1b, in order to generate the control voltage signal Vgs of the transistor, an analogue RC circuit is employed that converts a vertical voltage ramp, in which the voltage instantaneously or near-instantaneously passes from a voltage $V_{max}$ (for example 12V) that is higher than Vgs(sat) to a zero voltage, into a curved voltage ramp allowing the transition time between $V_{max}$ and the zero voltage to be slowed, thereby leaving time to carry out measurements in the linear phase between Vgs(sat) and Vgs(th). FIG. 2a shows the variation in the control voltage Vgs in the short-circuit phase $\varphi_{cc}$, linear phase $\varphi_{lin}$ and open-circuit phase $\varphi_{oc}$, and FIG. 2b shows the parallel variation in the current I produced by the photovoltaic installation and the voltage V across its terminals.

In practice, this method for plotting the I-V curve consumes time and resources for multiple reasons. Before reaching the linear phase in which the voltage and the current of the photovoltaic module vary, it is necessary to wait for the control voltage Vgs to decrease to the level of the voltage Vgs(sat), which results in a certain delay between triggering the plotting operation (i.e. the start of the ramp at 12 V) and the period of use for making measurements (i.e. the linear phase $\varphi_{lin}$). The duration of the end of the ramp, subsequent to the linear phase $\varphi_{lin}$, is also quite long. Additionally, as the saturation voltage Vgs(sat) and the threshold voltage Vgs(th) may vary with temperature, it is necessary to acquire measurement points of the voltage and current of the photovoltaic installation over the entirety or near-entirety of the ramp, then to process the measured data in order to extract therefrom those corresponding to the linear phase $\varphi_{lin}$.

The present invention improves the situation.

OBJECT OF THE INVENTION

To this end, the invention relates to a method for determining current-voltage characteristics of a photovoltaic installation comprising the following steps:
- connecting a MOSFET-type transistor to the photovoltaic installation;
- applying, to the transistor, a signal of a control voltage that crosses a linear regime range of the transistor, between two critical voltages comprising a saturation voltage and a threshold voltage; and
- measuring the current and the voltage of the photovoltaic installation while said range corresponding to the linear regime of the transistor is being crossed, characterized in that the control voltage signal of the transistor is generated from a digital control signal and in that, the transistor initially being in short-circuit or open-circuit regime, a command is issued for a first, rapid variation in the control voltage in the direction of said linear regime range of the transistor, then a second, slow variation in the control voltage crossing said linear regime range of the transistor, the transition between the first and the second variation being discontinuous.

The terms "rapid" and "slow" are mutually relative and mean that the speed of variation in the control voltage is higher in the phase of variation referred to as being "rapid" than in the phase of variation referred to as being "slow".

By virtue of the invention, the duration of the operation to determine the current-voltage characteristics is greatly decreased as the control voltage of the transistor quickly reaches, in a digitally controlled manner, the linear regime range of the transistor, i.e. the range of control voltages between the saturation voltage and the threshold voltage of the transistor. Furthermore, this linear regime range is slowly crossed at a digitally controlled speed, thereby allowing a sufficient number of measurements of the current and voltage of the photovoltaic installation to be made.

In one particular embodiment, the transistor initially being in short-circuit regime, a command is issued for a first, rapid drop in the control voltage in the direction of said linear regime range of the transistor, then a second, slow drop in the control voltage crossing said linear regime range of the transistor.

Thus, the current-voltage characteristics of the photovoltaic installation are determined when the transistor passes from the short-circuit regime to the open-circuit regime, during the intermediate linear regime.

Advantageously, the duration of the second, slow variation in the control voltage is between 0.8 ms and 10 ms.

Also advantageously, the duration of the first, rapid variation in the control voltage is less than or equal to 10 µs.

In one particular embodiment, subsequent to the second, slow drop in the control voltage, a command is issued for a third, rapid drop in said control voltage to a zero voltage, the transition between the second and the third drop being discontinuous.

Thus, the duration of the phase subsequent to the linear regime range in which the control voltage is reset to zero is decreased, thereby further decreasing the overall duration of the operation.

Advantageously, the duration of the third, rapid drop is less than or equal to 10 µs.

Also advantageously, the control voltage signal comprising an initial phase in which the control voltage is zero, a command is issued for increasing said control voltage from the zero voltage up to a high voltage higher than the saturation voltage, then holding the high voltage for a duration of between 10 nanoseconds and 100 nanoseconds.

In one particular embodiment, a PWM signal is generated using a microcontroller that digitally controls variations in a duty cycle of said PWM signal, then the signal is filtered using a low-pass filter so as to obtain a voltage signal having a desired profile.

Advantageously, said voltage signal having the desired profile is power-amplified in order to obtain the control voltage signal.

The control voltage signal is produced from a PWM signal whose duty cycle is digitally controlled by a microcontroller. By varying this duty cycle and the speed of variation in this duty cycle via digital commands, an analogue voltage signal having the desired profile is generated as output from the low-pass filter. The amplification device allows this signal to be scaled to the transistor to be controlled, i.e. it allows the voltage output from the filter to be amplified in order to obtain a voltage level that is suitable for controlling the transistor.

In one variant embodiment, during the first variation in the control voltage, at least one of the physical quantities relating to the transistor from the group comprising a temperature, a current and a voltage is measured, in order to detect the linear regime of the transistor.

The transistor may be of IGBT type.

The invention also relates to a system for determining current-voltage characteristics of a photovoltaic installation comprising a MOSFET-type transistor to be connected to the terminals of the photovoltaic installation, a control circuit intended to apply, to the transistor, a signal of a control voltage that crosses a linear regime range of the transistor, between two critical voltages comprising a saturation voltage and a threshold voltage, and a measuring device for measuring the current and the voltage of the photovoltaic installation while said range corresponding to the linear regime of the transistor is being crossed, characterized in that the control circuit is a digital control circuit suitable for producing a control voltage signal of the transistor, initially in short-circuit or open-circuit regime, which comprises a first, rapid variation in the control voltage in the direction of said linear regime range of the transistor, then a second, slow variation in the control voltage crossing said linear regime range of the transistor, the transition between the first and the second variation being discontinuous.

The system advantageously comprises all or some of the following additional features:

the transistor initially being in short-circuit regime, the control voltage signal comprises a first, rapid drop in the control voltage in the direction of said linear regime range of the transistor, then a second, slow drop in the control voltage crossing said linear regime range of the transistor;

the digital control circuit comprises a microcontroller intended to generate a PWM signal and to modify a duty cycle of said PWM signal and a low-pass filter intended to filter the PWM signal so as to obtain a voltage signal having a desired profile;

the system comprises a power amplification device intended to power-amplify the voltage signal having the desired profile in order to obtain the control voltage signal;

the system comprises sensors for measuring at least one of the physical quantities relating to the transistor from the group comprising a temperature, a current and a voltage, and a detection module intended to detect the linear regime of the transistor on the measurements;

the transistor is of IGBT type.

BRIEF DESCRIPTION OF THE DRAWINGS

The invention will be better understood with the aid of the following description of a particular embodiment of the method for determining current-voltage characteristics of a photovoltaic installation of the invention, given with reference to the appended drawings in which:

FIGS. 1a and 1b show an analogue RC circuit employed to convert a vertical voltage ramp to a curved voltage ramp;

DETAILED DESCRIPTION OF PARTICULAR EMBODIMENTS OF THE INVENTION

Figure 2A:
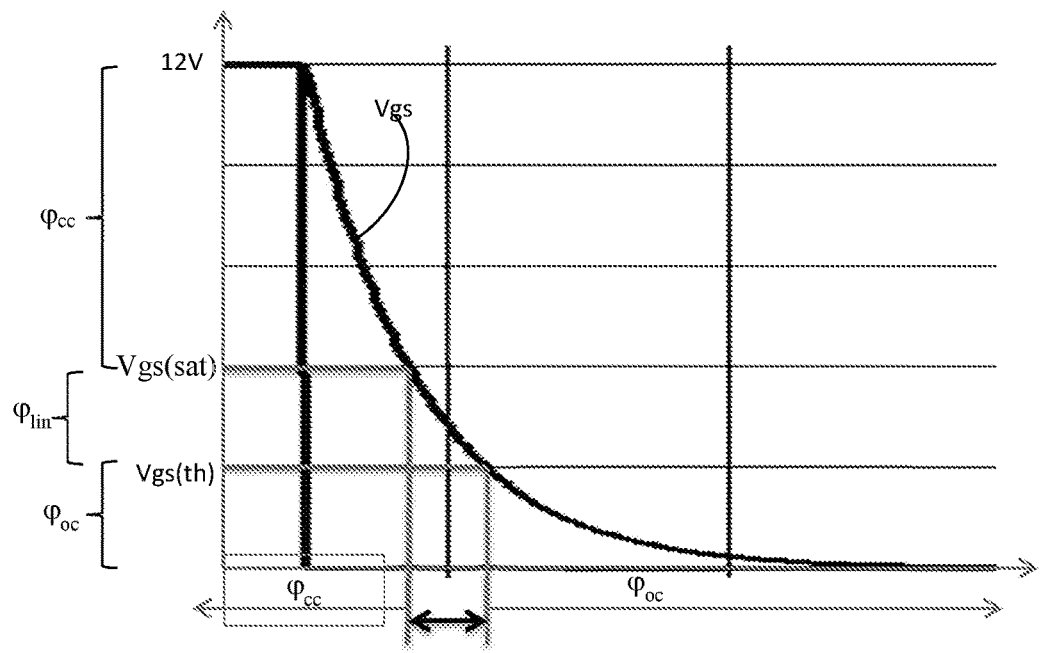
FIG. 2a shows the variation in the control voltage Vgs in the short-circuit phase, linear phase and open-circuit phase.
Figure 2B:
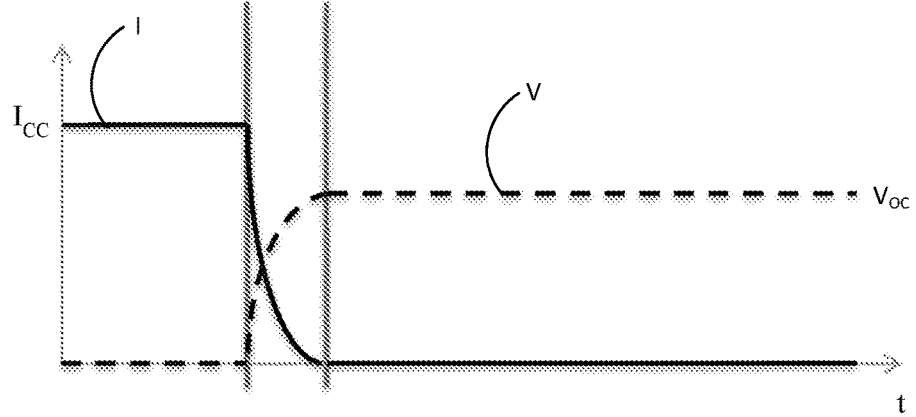
FIG. 2b shows the parallel variation in the current I produced by the photovoltaic installation and the voltage V across its terminals.

The invention aims to determine the current-voltage characteristics of a photovoltaic installation 1, allowing the characteristic I-V (current-voltage) curve of the photovoltaic installation 1 to be plotted. The photovoltaic installation 1 may comprise one or more photovoltaic modules, for example a string of photovoltaic modules. It may be part of a photovoltaic electrical energy production plant.

In order to determine the current-voltage characteristics of a photovoltaic installation, a monitoring system 2 including the following elements is used:

a MOSFET-type transistor 3;

a control circuit 4, intended to control the operation of the transistor 3;

a measuring device 5 for measuring the voltage and the current of the photovoltaic installation 1;

a user interface 6;

cables and connectors for connecting the transistor 3 and the measuring device 5 to a photovoltaic installation to be controlled.

Figure 6:
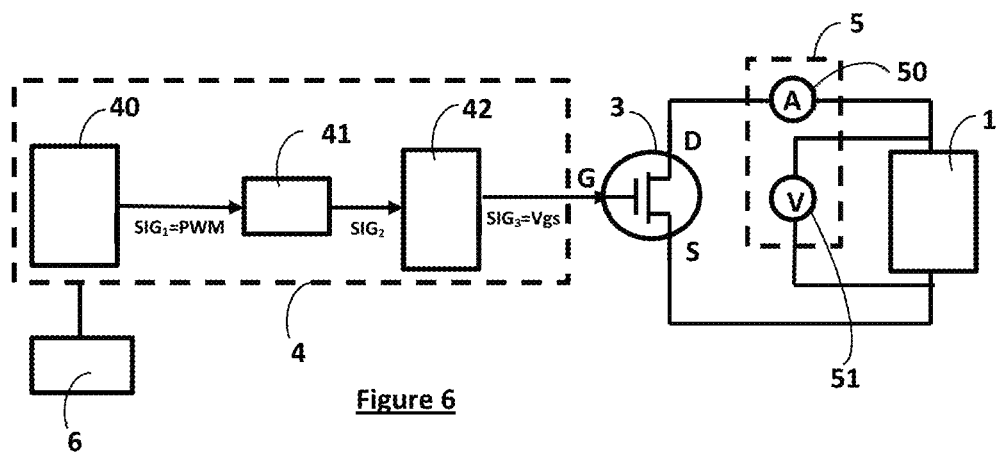
FIG. 6 shows a function block diagram of a system for determining current-voltage characteristics of a photovoltaic installation according to one particular embodiment of the invention.

The transistor 3, in this instance a MOSFET, is intended to be connected to the photovoltaic installation 1 so that the transistor 3 and the photovoltaic installation 1 are connected in series in a closed circuit, as shown in FIG. 6. The transistor 3 is used to determine the current-voltage characteristics of the photovoltaic installation 1. Another transistor, not shown, is used to isolate, or disconnect, the photovoltaic installation 1 from the production system.

The measuring device 5 is intended to measure the output current I of the photovoltaic installation 1 and the voltage V across the terminals of the photovoltaic installation 1. It comprises, in this instance, a current-measuring device 50 connected in series with the photovoltaic installation 1 and a voltage-measuring device 51 connected in parallel to the terminals of the photovoltaic installation 1.

The control circuit 4 is intended to deliver a control voltage signal to the MOSFET transistor 3. This control voltage of the transistor 3 is the voltage Vgs between the gate and the source of the MOSFET. The circuit 4 is a digital control circuit. It comprises a microcontroller 40, a low-pass filter 41 and an amplification device 42.

The microcontroller 40 is intended to produce a digital control signal in order to generate a PWM (pulse width modulation) output signal, denoted by $SIG_1$. It is a logic signal with two states, high and low, of fixed frequency but whose duty cycle is digitally controlled. As output from the microcontroller, the PWM signal is a signal with two voltage states, high and low, the high state corresponding to a high voltage, generally 3.3 V, and the low state corresponding to a zero voltage. Digital commands of the microcontroller 40 allow the duty cycle of the PWM signal to be varied.

The low-pass filter 41, connected to the output of the microcontroller 40, is intended to average the PWM signal $SIG_1$ output from the microcontroller, this average being proportional to the duty cycle. By varying the duty cycle, it is thus possible to obtain, as output from the low-pass filter 41, an analogue voltage signal, denoted by $SIG_2$, having a desired profile, i.e. a profile analogous to that of the desired control voltage signal.

The amplification device 42, connected to the output of the low-pass filter 41, is intended to power-amplify the voltage signal $SIG_2$ delivered by the low-pass filter 41 in order to produce a control voltage signal $SIG_3$ that is suitable for controlling the MOSFET transistor 3 (i.e. having an adequate voltage level). This control voltage signal $SIG_3$ is applied between the gate and the source of the MOSFET transistor 3. The voltage Vgs between the gate and the source of the MOSFET 3 is therefore equal to the signal $SIG_3$.

Figure 7:
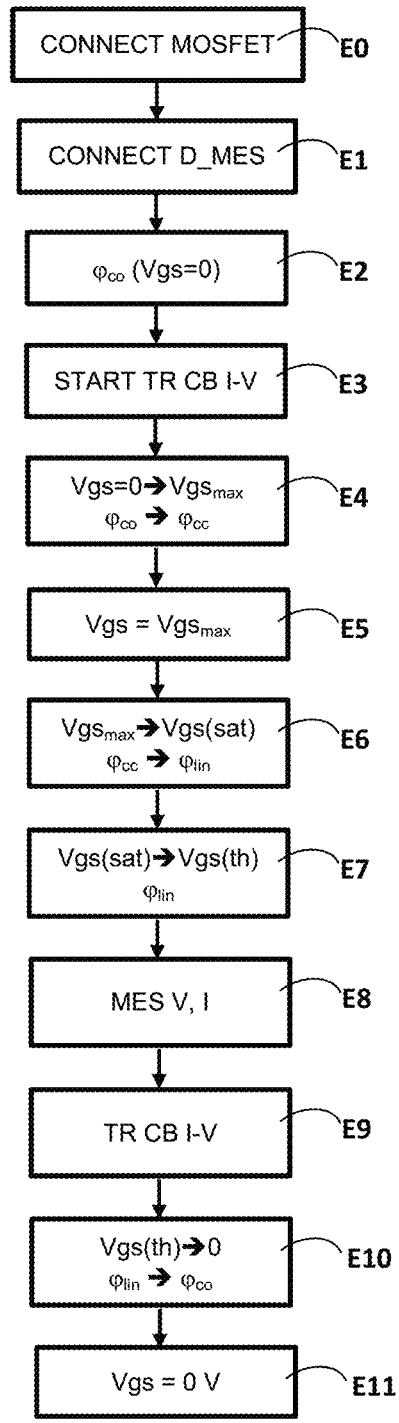
FIG. 7 shows a flow diagram of the steps of the plotting method according to one particular embodiment of the invention.

The method for determining current-voltage characteristics of the photovoltaic installation 1 allowing the I-V curve thereof to be plotted according to one particular embodiment of the invention will now be described with reference to FIG. 7.

The method comprises a first step E0 of connecting the MOSFET, in which an operator connects the MOSFET transistor 3 in series with the photovoltaic installation 1, the MOSFET 3 and the installation 1 being connected in a closed circuit, as shown in FIG. 6. The control circuit 4 is connected to the MOSFET transistor and suitable for applying thereto a control voltage Vgs between the gate and the source.

As stated above, the control voltage signal Vgs is generated from a PWM signal ($SIG_1$) produced as output from the microcontroller 40. This PWM signal is subsequently filtered by the low-pass filter 41 then amplified by the device 42 in order to generate the control voltage signal Vgs. The duty cycle of the PWM signal $SIG_1$ that is produced as output from the microcontroller 40 is parameterized and controlled by digital commands generated by the microcontroller 40.

The method comprises a second step E1 of connecting the measuring device 5, in which the current-measuring device 50 is connected in series with the photovoltaic installation 1 and the voltage-measuring device 51 is connected in parallel to the terminals of the photovoltaic installation 1, as shown in FIG. 6.

In an initial phase or step E2, the control circuit 4 applies a zero control voltage Vgs to the MOSFET transistor 3. To this end, the microcontroller 40 generates, in this instance, a PWM signal $SIG_1$ as output, which signal has a duty cycle equal to zero, on the basis of a digital command stating α=0. In this initial phase E2, as the control voltage Vgs is zero and, consequently, lower than the threshold voltage Vgs(th), the MOSFET transistor 3 is in open-circuit regime, denoted by $\varphi_{co}$, and behaves as an open switch.

In a step E3, an operator triggers an operation of plotting the I-V curve of the photovoltaic installation 1, for example by activating a specific command from the user interface 6 of the installation 1 at an instant $t_1$.

Figure 3:
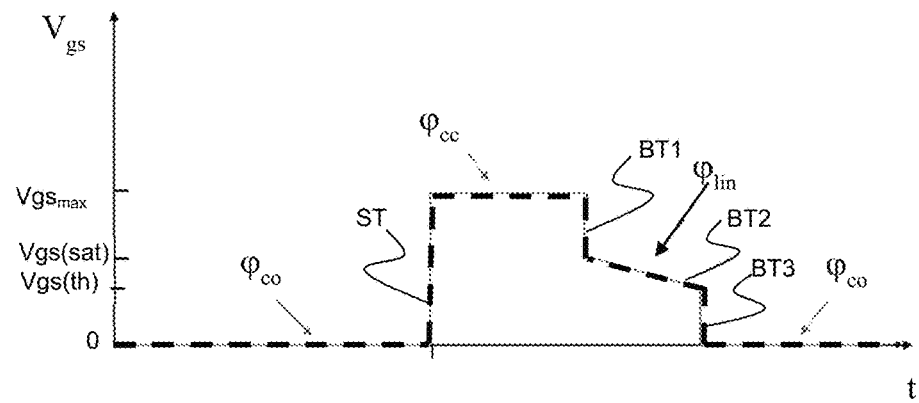
FIG. 3 schematically shows a control voltage signal of a MOSFET transistor, according to one particular embodiment of the invention.

On activation of the command for plotting the I-V curve, the microcontroller 40 issues a command for increasing the duty cycle α of the PWM signal $SIG_1$ so that this duty cycle α is rapidly made to pass from the value 0 to the value 1, in a step E4. Correspondingly, the control circuit 4 increases the control voltage Vgs applied to the transistor 3, which rapidly passes from the zero voltage to a maximum high voltage, denoted by $Vgs_{max}$, for example equal to 12 V. This high voltage $Vgs_{max}$ is in any event higher than the saturation voltage Vgs(sat) of the transistor 3. The control voltage signal Vgs ($SIG_3$) thus comprises a voltage jump ST between 0 V and $Vgs_{max}$ (12 V in this instance). The duration of this voltage jump ST, between the instant $t_1$ and an instant $t_2$, is advantageously of the order of a few microseconds, advantageously less than 10 μs. The voltage jump ST could be instantaneous or near-instantaneous, as shown in FIG. 3. This increase in the control voltage Vgs makes the MOSFET transistor 3 pass from the initial open-circuit regime $\varphi_{co}$ to a short-circuit regime, denoted by $\varphi_{cc}$, in which the transistor 3 behaves as a closed switch.

In a step E5, the microcontroller 40 issues a command to hold the duty cycle α at 1 for a short duration d, between the instant $t_2$ and an instant $t_3$. This duration d is advantageously between 10 nanoseconds and 100 nanoseconds. Correspondingly, the control circuit 4 applies a stable control voltage Vgs, equal to the maximum high voltage $Vgs_{max}$ (12 V in this instance), for the duration d. During this plateau in the voltage $Vgs_{max}$, the transistor 3 remains in short-circuit regime $\varphi_{cc}$.

Once the duration d has ended, starting from the instant $t_3$, the microcontroller 40 issues a command for a first decrease, referred to as a "rapid" decrease, in the duty cycle α in order to make it pass quickly, or even instantaneously or near-instantaneously, from the value 1 to a first critical value, in a step E6. This first critical value of the duty cycle α corresponds to a control voltage equal, or substantially equal to the saturation voltage Vgs(sat) of the transistor 3. It is equal to 0.35 in the example of FIG. 4. The saturation voltage Vgs(sat) is, in this instance, as stated in the technical specifications of the transistor 3 that are provided by the manufacturer. It is memorized by the microcontroller 40 which, through calculation, deduces therefrom the critical value of the corresponding duty cycle α. Correspondingly, the control circuit 4 issues a command for a first, rapid drop in the control voltage Vgs applied to the transistor 3 which makes it pass from the high voltage $Vgs_{max}$ to a first critical voltage that is equal to the saturation voltage Vgs(sat). This first, rapid drop in voltage is denoted by BT1. Its duration is preferably less than 10 μs, for example of the order of a few microseconds. It could be instantaneous or near-instantaneous. In a variant, the first, rapid drop in the control voltage makes it possible to approach the saturation voltage Vgs (sat), or stated otherwise to reach a voltage close thereto.

Figure 4:
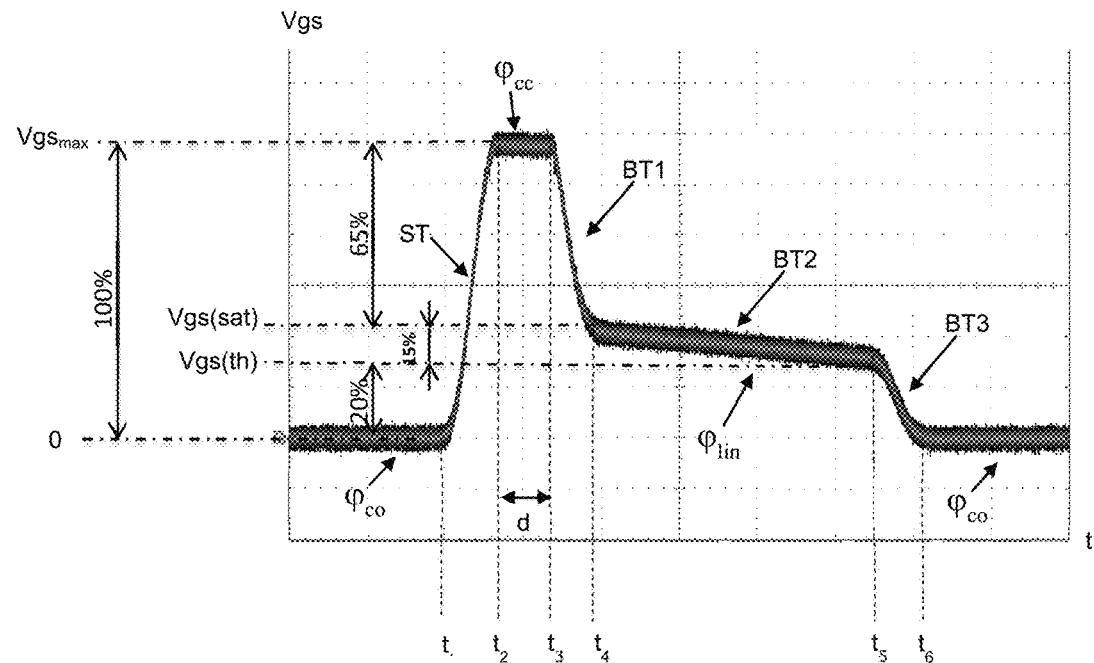
FIG. 4 shows a control voltage signal of a measured MOSFET transistor, according to a first particular exemplary embodiment of the invention.
Figure 5:
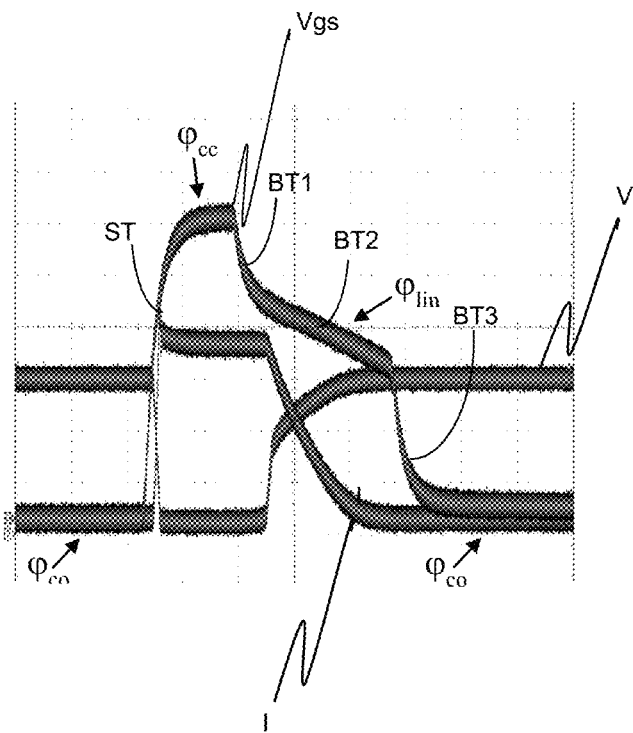
FIG. 5 shows a control voltage signal of a measured IGBT transistor, according to a second particular exemplary embodiment of the invention.

After the first, rapid drop in voltage BT1, in a step E7, the microcontroller 40 slows the decrease in the duty cycle α in order to make it pass slowly from the first critical value (equal to 0.35 in FIG. 4) to a second critical value (equal to 0.20 in FIG. 4). This second critical value of the duty cycle α corresponds to a control voltage equal to the threshold voltage Vgs(th) of the transistor 3. Correspondingly, the decrease in the control voltage Vgs is slowed. The control circuit 4 thus controls a second, slow drop in the control voltage Vgs, denoted by BT2, until reaching the level of the threshold voltage Vgs(th). The control voltage Vgs decreases slowly in order to pass from the saturation voltage Vgs(sat) to the threshold voltage Vgs(th). In this phase of a slow drop BT2 in the control voltage Vgs, the transistor 3 is in linear regime $\varphi_{lin}$ and behaves as a variable resistor. The control voltage Vgs thus crosses the linear regime range of the transistor 3 between Vgs(sat) and Vgs(th). The threshold voltage Vgs(th) is part of the technical specifications of the transistor 3 that are provided by the manufacturer and is memorized in the microcontroller 40. The duration of this phase of a slow drop BT2 in the control voltage is between 800 μs and 10 ms.

The transition between the first, rapid drop BT1 and the second, slow drop BT2 in the control voltage Vgs is discontinuous, i.e. sudden or not gradual. This translates into a discontinuity in the variation of the control voltage Vgs over time between the two drop phases BT1 and BT2.

In the phase of a slow drop BT2 in the control voltage Vgs, the transistor 3 being in linear regime, the measuring device 5 measures the voltage V across the terminals of the photovoltaic installation 1 and the output current I of the photovoltaic installation 1, in a step E8. The measurements of V and I while the transistor 3 is in linear regime allow the characteristic I-V curve of the photovoltaic installation 1 to be plotted, in a step E9. This I-V curve may be displayed on a screen of the user interface 6.

After the second, slow drop BT2 in the control voltage Vgs, starting from an instant $t_5$, in a step E10, the microcontroller 40 issues a command for a sudden or rapid decrease in the duty cycle α in order to make it pass rapidly from the second critical value (equal to 0.20 in this instance) to the value 0. Correspondingly, the control circuit 4 issues a command for a third, rapid drop BT3 in the control voltage Vgs which makes it pass from the threshold voltage Vgs(th) to a zero voltage. The duration of this phase BT3 of a rapid drop in the control voltage Vgs is advantageously less than 10 μs, for example of the order of a few microseconds. The drop BT3 could be instantaneous or near-instantaneous. The drop BT3 makes the control voltage Vgs pass below the threshold voltage Vgs(th) so that the transistor 3 switches to open-circuit regime $\varphi_{co}$.

The transition between the second, slow drop BT2 and the third, rapid drop BT3 in the control voltage Vgs is discontinuous, i.e. sudden or not gradual. This translates into a discontinuity in the variation of the control voltage Vgs over time between the two drop phases BT2 and BT3.

The terms "rapid" and "slow" are understood to mean that the speed of variation in the voltage is higher in the phase of variation BT1 (or BT3) referred to as being "rapid" than in the second phase of variation BT2 referred to as being "slow".

In a step E11, starting from an instant $t_6$, the microcontroller 40 issues a command to hold the duty cycle α at 0. Correspondingly, the control circuit 4 applies a stable control voltage Vgs, equal to a value of 0 V. The transistor 3 remains in open-circuit regime $\varphi_{co}$.

In the preceding description, the start and the end of the range of control voltages corresponding to the linear regime of the transistor are determined on the basis of the saturation voltage Vgs(sat) and the threshold voltage Vgs(th) stated by the manufacturer. In another embodiment, the start and/or end of this linear regime range are detected on the basis of measurements of one or more of the physical quantities relating to the transistor from the group comprising a temperature, a current and a voltage. For example, the start of the linear phase may be detected through a variation in the voltage across and/or in the current flowing through the terminals of the transistor 3. The end of the linear phase may be detected through an absence of variation in the same quantities across and/or flowing through the terminals of the transistor 3. These measurements relating to the transistor allow the transition between the short-circuit regime and the linear regime and the transition between the linear regime and the open-circuit regime to be detected.

In the embodiment described above, the characteristic current and voltage data relating to the photovoltaic installation 1 are measured when the transistor is in linear regime passing from the short-circuit regime to the open-circuit regime, or stated otherwise when the control voltage crosses the Miller range from the saturation voltage Vgs(sat) to the threshold voltage Vgs(th). As a variant, the characteristic current and voltage data of the photovoltaic installation 1 could be measured when the transistor is in linear regime passing from the open-circuit regime to the short-circuit regime, or stated otherwise when the control voltage crosses the Miller range from the threshold voltage Vgs(th) to the saturation voltage Vgs(sat). In this case, as the transistor is initially in open-circuit regime (the applied control voltage Vgs being zero), the circuit 4 issues a command for a first, rapid increase in the control voltage in the direction of the linear regime range of the transistor, or Miller range, then a second, slow increase in the control voltage crossing the linear regime range of the transistor, the transition between the two, rapid and slow, increases being discontinuous.

Thus, in general, the invention is based on the generation of a control voltage signal Vgs of the transistor 3 from a digital control signal. The transistor initially being either in short-circuit ($\varphi_{cc}$) or in open-circuit ($\varphi_{co}$) regime, the control voltage signal comprises a first, rapid variation in the control voltage Vgs in the direction of the linear regime range of the transistor 3, then a second, slow variation in the control voltage Vgs crossing this linear regime range of the transistor 3, the transition between the first and the second variation being discontinuous (not gradual).

The invention claimed is:

1. A method for determining current-voltage characteristics of a photovoltaic installation comprising:
   connecting a MOSFET-type transistor to the photovoltaic installation;
   applying, to the transistor, a signal of a control voltage that crosses a linear regime range of the transistor, between two critical voltages comprising a saturation voltage and a threshold voltage; and
   measuring the current and the voltage of the photovoltaic installation while the range corresponding to the linear regime of the transistor is being crossed,
   wherein the control voltage signal of the transistor is generated from a digital control signal and wherein, the transistor initially being in short-circuit or open-circuit regime, a command is issued for a first, rapid variation in the control voltage in the direction of the linear regime range of the transistor, then a second, slow variation in the control voltage crossing the linear regime range of the transistor, the transition between the first and the second variation being discontinuous.

2. The method according to claim 1, wherein, the transistor initially being in short-circuit regime, a command is issued for a first, rapid drop in the control voltage in the direction of the linear regime range of the transistor, then a second, slow drop in the control voltage crossing the linear regime range of the transistor.

3. The method according to claim 1, wherein the duration of the second, slow variation in the control voltage is between 0.8 ms and 10 ms.

4. The method according to claim 1, wherein the duration of the first, rapid variation in the control voltage is less than or equal to 10 μs.

5. The method according to claim 1, wherein a PWM signal is generated using a microcontroller that digitally controls variations in a duty cycle of the PWM signal, then the signal is filtered using a low-pass filter so as to obtain a voltage signal having a desired profile.

6. The method according to claim 1, wherein, during the first variation in the control voltage, at least one of the physical quantities relating to the transistor from the group comprising a temperature, a current and a voltage is measured, in order to detect the linear regime of the transistor.

7. The method according to claim 1, wherein the transistor is of IGBT type.

8. The method according to claim 2, wherein the duration of the first, rapid variation in the control voltage is less than or equal to 10 μs.

9. The method according to claim 3, wherein, subsequent to the second, slow drop in the control voltage, a command is issued for a third, rapid drop in the control voltage to a zero voltage, the transition between the second and the third drop being discontinuous.

10. The method according to claim 2, wherein, subsequent to the second, slow drop in the control voltage, a command is issued for a third, rapid drop in the control voltage to a zero voltage, the transition between the second and the third drop being discontinuous.

11. The method according to claim 2, wherein the duration of the third, rapid drop is less than or equal to 10 μs.

12. The method according to claim 2, wherein, the control voltage signal comprising an initial phase in which the control voltage is zero, a command is issued for increasing the control voltage from the zero voltage up to a high voltage higher than the saturation voltage, then holding the high voltage for a duration of between 10 nanoseconds and 100 nanoseconds.

13. The method according to claim 5, wherein the voltage signal having the desired profile is power-amplified in order to obtain the control voltage signal.

14. A system for determining current-voltage characteristics of a photovoltaic installation comprising a MOSFET-type transistor to be connected to the terminals of the photovoltaic installation, a control circuit configured to apply, to the transistor, a signal of a control voltage that crosses a linear regime range of the transistor, between two critical voltages comprising a saturation voltage and a threshold voltage, and a measuring device for measuring the current and the voltage of the photovoltaic installation while the range corresponding to the linear regime of the transistor is being crossed,
   wherein the control circuit is a digital control circuit adapted to produce a control voltage signal of the transistor, initially in short-circuit or open-circuit regime, which comprises a first, rapid variation in the control voltage in the direction of the linear regime range of the transistor, then a second, slow variation in the control voltage crossing the linear regime range of the transistor, the transition between the first and the second variation being discontinuous.

15. The system according to claim 14, wherein, the transistor initially being in short-circuit regime, the control voltage signal comprises a first, rapid drop in the control voltage in the direction of the linear regime range of the transistor, then a second, slow drop in the control voltage crossing the linear regime range of the transistor.

16. The system according to claim 14, wherein the digital control circuit comprises a microcontroller configured to generate a PWM signal and to modify a duty cycle of the PWM signal and a low-pass filter configured to filter the PWM signal so as to obtain a voltage signal having a desired profile.

17. The system according to claim 14, comprising sensors for measuring at least one of the physical quantities relating to the transistor from the group comprising a temperature, a current and a voltage, and a detection module configured to detect the linear regime of the transistor based on the measurements.

18. The system according to claim 14, wherein the transistor is of IGBT type.

19. The system according to claim 15, wherein the digital control circuit comprises a microcontroller configured to generate a PWM signal and to modify a duty cycle of the PWM signal and a low-pass filter configured to filter the PWM signal so as to obtain a voltage signal having a desired profile.

20. The system according to claim 16, comprising a power amplification device configured to power-amplify the voltage signal having the desired profile in order to obtain the control voltage signal.

* * * * *